(12) United States Patent
Kamisuki et al.

(10) Patent No.: US 6,899,974 B2
(45) Date of Patent: May 31, 2005

(54) SECONDARY BATTERY OF PROTON CONDUCTIVE POLYMER

(75) Inventors: Hiroyuki Kamisuki, Tokyo (JP); Toshihiko Nishiyama, Tokyo (JP); Gaku Harada, Tokyo (JP); Shinya Yoshida, Tokyo (JP); Masato Kurosaki, Tokyo (JP); Yuuji Nakagawa, Tokyo (JP); Tomoki Nobuta, Tokyo (JP); Masaya Mitani, Tokyo (JP)

(73) Assignee: NEC Tokin Corporation, Miyagi (JP)

( * ) Notice: Subject to any disclaimer, the term of this patent is extended or adjusted under 35 U.S.C. 154(b) by 93 days.

(21) Appl. No.: 09/985,272

(22) Filed: Nov. 2, 2001

(65) Prior Publication Data

US 2002/0076608 A1 Jun. 20, 2002

(30) Foreign Application Priority Data

Nov. 2, 2000 (JP) .......................... 2000-336276

(51) Int. Cl.$^7$ ............................................... H01M 2/16
(52) U.S. Cl. ........................ 429/101; 429/212; 429/213; 429/303
(58) Field of Search ................................. 429/101, 303, 429/212, 213, 214, 215, 216, 217, 129, 136, 141, 145, 204, 705

(56) References Cited

U.S. PATENT DOCUMENTS

| | | | | |
|---|---|---|---|---|
| 5,989,742 | A | * 11/1999 | Cabasso et al. | ............... 429/33 |
| 6,300,015 | B1 | * 10/2001 | Nishiyama et al. | ......... 429/303 |
| 2001/0028977 | A1 | * 10/2001 | Kazacos et al. | ............ 429/105 |

FOREIGN PATENT DOCUMENTS

| | | |
|---|---|---|
| EP | 0 966 054 A1 | 12/1999 |
| JP | 11-288717 | 10/1999 |

OTHER PUBLICATIONS

U.S. Appl. No. 10/838,742, filed May 4, 2004, Kamisuki, Hiroyuki, Electrochemical Cell Stack.*
U.S. Appl. No. 10/834,005, filed Apr. 29, 2004, Kamisuki, Hiroyuki, Secondary Battery and Capacitor Utilizing Indole Compounds.*
U.S. Appl. No. 10/827,179, filed Apr. 19, 2004, Kamisuki, Hiroyuki, Electrochemical Cell.*
U.S. Appl. No. 10/827,074, filed Apr. 19, 2004, Kamisuki, Hiroyuki, Electrode for Electrochemical Cell and Electrochemical Cell Therewith.*
U.S. Appl. No. 10/804,891, filed Mar. 19, 2004, Kamisuki, Hiroyuki, Electrode and Electrochemical Cell Therewith.*
U.S. Appl. No. 10/634,607, filed Aug. 5, 2003, Kamisuki, Hiroyuki, Cell Electrode and Electrochemical Cell Therewith.*
U.S. Appl. No. 10/443,031, filed May 22, 2003, Kamisuki, Hiroyuki, Storage Element and Method of Fabricating Same.*
U.S. Appl. No. 10/365,550, filed Feb. 13, 2003, Kamisuki, Hiroyuki, Secondary Battery and Capacitor Utilizing Indole Compounds.*

(Continued)

*Primary Examiner*—Michael Barr
*Assistant Examiner*—Monique Wills
(74) *Attorney, Agent, or Firm*—Young & Thompson

(57) ABSTRACT

A secondary battery of a proton conductive polymer, wherein a positive electrode 2 and a negative electrode 4 are arranged facing to each other via a separator in an electrolytic solution and only a proton in a π conjugated polymer or a proton of a hydroxyl group in a hydroxyl-containing macromolecular as an active material of an electrode in the positive and negative electrodes participates in a charge/discharge; the secondary battery uses a membrane, which has acid resistance, oxidation resistance and a functional group having cation exchange function, as the separator 3.

4 Claims, 5 Drawing Sheets

OTHER PUBLICATIONS

U.S. Appl. No. 10/346,102, filed Jan. 17, 2003, Kamisuki, Hiroyuki, Battery Having a Sheet Current Collector Fluid–Tightly Separating Basic Cells.*

U.S. Appl. No. 10/331,019, filed Dec. 27, 2002, Kamisuki, Hiroyuki, Energy Device Having Collectors with Rubber Materials Stacked in Layers and a Method of Fabricating the Energy Device.*

U.S. Appl. No. 10/286,692, filed Nov. 1, 2002, Kamisuki, Hiroyuki, Electrochemical Cell Using Indole–Related Compounds.

U.S. Appl. No. 10/271,636, filed Oct. 15, 2002, Kamisuki, Hiroyuki, Electrolytic Solution and Electrochemical Cell Using the Same.

U.S. Appl. No. 10/153,631, filed May 24, 2002, Kamisuki, Hiroyuki, Method of Producing Electric Cells.

U.S. Appl. No. 09/985,272, filed Nov. 2, 2001, Kamisuki, Hiroyuki, Secondary Battery of Proton Conductive Polymer.

U.S. Appl. No. 09/983,711 filed Oct. 25, 2001, Kamisuki, Hiroyuki, Method for Manufacturing Polymer Battery.

U.S. Appl. No. 10/902,466, filed Jul. 30, 2004, Nishiyama, Toshihiko, Molded Electrode, Method for Production Thereof, and Secondary Battery Using Thereof.

U.S. Appl. No. 10/886,681 filed Jul. 9, 2004, Nishiyama, Toshihiko, Fuel Injection Controlling Apparatus for Engine.

U.S. Appl. No. 10/869,098, filed Jun. 17, 2004, Nishiyama, Toshihiko, Turbocharger.

U.S. Appl. No. 10/869,097 filed Jun. 17, 2004, Nishiyama, Toshihiko, Compressor of Turbo Machine and Its Compressor Wheel.

U.S. Appl. No. 10/847,821, filed May 17, 2004, Nishiyama, Toshihiko, Internal Combustion Engine Provided with Air–Supply Bypass Control Device.

U.S. Appl. No. 10/837,320, filed Apr. 30, 2004, Nishiyama, Toshihiko, Membrane Electrode Assembly, Manufacturing Process Therefor and Solid–Polymer Fuel Cell.

U.S. Appl. No. 10/834,005, filed Apr. 29, 2004, Nishiyama, Toshihiko, Secondary Battery and Capacitor Utilizing Indole Compounds.

U.S. Appl. No. 10/827,074, filed Apr. 19, 2004, Nishiyama, Toshihiko, Electrode for Electrochemical Cell and Electrochemical Cell Therewith.

U.S. Appl. No. 10/814,325, filed Mar. 31, 2004, Nishiyama, Toshihiko, Unit Cell for Fuel Cell and Fuel Cell Therewith.

U.S. Appl. No. 10/716,672, filed Nov. 20, 2003, Nishiyama, Toshihiko, Electrode Using Improved Active Material and Capacitor.

U.S. Appl. No. 10/658,401, filed Sep. 10, 2003, Nishiyama, Toshihiko, Exhaust Gas Denox Apparatus for Engine.

U.S. Appl. No. 10/634,607, filed Aug. 5, 2003, Nishiyama, Toshihiko, Cell Electrode and Electrochemical Cell Therewith.

U.S. Appl. No. 10/496,934, filed May 26, 2004, Nishiyama, Toshihiko, Variable Turbocharger.

U.S. Appl. No. 10/443,031, filed May 22, 2003, Nishiyama, Toshihiko, Storage Element and Method of Fabricating Same.

U.S. Appl. No. 10/365,550, filed Feb. 13, 2003, Nishiyama, Toshihiko, Secondary Battery and Capacitor Utilizing Indole Compounds.

U.S. Appl. No. 10/346,102 filed Jan. 17, 2003, Nishiyama, Toshihiko, Battery Having a Sheet Current Collector Fluid–Tightly Separating Basic Cells.

U.S. Appl. No. 10/331,019, filed Dec. 27, 2002, Nishiyama, Toshihiko, Energy Device Having Collectors with Rubber Materials Stacked in Layers and a Method of Fabricating the Energy Device.

U.S. Appl. No. 10/323,704, filed Dec. 18, 2002, Nishiyama, Toshihiko, Method of Producing Rotary Vane Member and Rotary Vane Member.

U.S. Appl. No. 10/286,692, filed Nov. 1, 2002, Nishiyama, Toshihiko, Electrochemical Cell Using Indole–Related Compounds.

U.S. Appl. No. 10/271,636, filed Oct. 15, 2002, Nishiyama, Toshihiko, Electrolytic Solution and Electrochemical Cell Using the Same.

U.S. Appl. No. 10/153,631, filed May 24, 2002, Nishiyama, Toshihiko, Method of Producing Electric Cells.

U.S. Appl. No. 10/044,985, filed Jan. 15, 2002, Nishiyama, Toshihiko, Secondary Battery and Capacitor Using Indole Polymeric Compound.

U.S. Appl. No. 10/003,699, filed Oct. 23, 2001, Nishiyama, Toshihiko, Vapor Deposition Method and Apparatus.

U.S. Appl. No. 09/985,272, filed Nov. 2, 2001, Nishiyama, Toshihiko, Secondary Battery of Proton Conductive Polymer.

U.S. Appl. No. 09/983,711 filed Oct. 25, 2001, Nishiyama, Toshihiko, Method for Manufacturing Polymer Battery.

U.S. Appl. No. 09/689,817, filed Oct. 13, 2000, Nishiyama, Toshihiko, Molded Electrode, Method for Production Thereof, and Secondary Battery Using Thereof.

U.S. Appl. No. 09/528,711, filed Mar. 20, 2000, Nishiyama, Toshihiko, Electrode Using Improved Active Material for Battery and Capacitor.

U.S. Appl. No. 10/953,061 filed Sep. 30, 2004, Harada, Gaku, Organic Electroluminescent Device and Fabrication Method Thereof.

U.S. Appl. No. 10/902,466, filed Jul. 30, 2004, Harada, Gaku, Molded Electrode, Method for Production Thereof, and Secondary Battery Using Thereof.

U.S. Appl. No. 10/868,347, filed Jun. 16, 2004, Harada, Gaku, Electroluminescence Panel and Manufacturing Process Therefor.

U.S. Appl. No. 10/834,005 filed Apr. 29, 2004, Harada, Gaku, Secondary Battery and Capacitor Utilizing Indole Compounds.

U.S. Appl. No. 10/716,672, filed Nov. 20, 2003, Harada, Gaku, Electrode Using Improved Active Material and Capacitor.

U.S. Appl. No. 10/346,102, filed Jan. 17, 2003, Harada, Gaku, Battery Having a Sheet Current Collector Fluid–Tightly Separating Basic Cells.

U.S. Appl. No. 10/331,019, filed Dec. 27, 2002, Harada, Gaku, Energy Device Having Collectors with Rubber Materials Stacked in Layers and a Method of Fabricating the Energy Device.

U.S. Appl. No. 10/286,692, filed Nov. 1, 2002, Harada, Gaku, Electrochemical Cell Using Indole–Related Compounds.

U.S. Appl. No. 10/271,636, filed Oct. 15, 2002, Harada, Gaku, Electrolytic Solution and Electrochemical Cell Using the Same.

U.S. Appl. No. 10/153,631, filed May 24, 2002, Harada, Gaku, Method of Producing Electric Cells.

U.S. Appl. No. 10/044,985, filed Jan. 15, 2002, Harada, Gaku, Secondary Battery and Capacitor Using Indole Polymeric Compound.

U.S. Appl. No. 09/985,272, filed Nov. 2, 2001, Harada, Gaku, Secondary Battery of Proton Conductive Polymer.

U.S. Appl. No. 09/983,711 filed Oct. 25, 2001, Harada, Gaku, Method for Manufacturing Polymer Battery.

U.S. Appl. No. 09/689,817, filed Oct. 13, 2000, Harada, Gaku, Molded Electrode, Method for Production Thereof, and Secondary Battery Using Thereof.

U.S. Appl. No. 09/528,711, filed Mar. 20, 2000, Harada, Gaku, Electrode Using Improved Active Material for Battery and Capacitor.

U.S. Appl. No. 09/175,723, filed Oct. 20, 1998, Harada, Gaku, Polymer Battery.

U.S. Appl. No. 10/902,466, filed Jul. 30, 2004, Kurosaki, Masato, Molded Electrode, Method for Production Thereof, and Secondary Battery Using Thereof.

U.S. Appl. No. 10/834,005, filed Apr. 29, 2004, Kurosaki, Masato, Secondary Battery and Capacitor Utilizing Indole Compounds.

U.S. Appl. No. 10/716,672, filed Nov. 20, 2003, Kurosaki, Masato, Electrode Using Improved Active Material and Capacitor.

U.S. Appl. No. 10/634,607, filed Aug. 5, 2003, Kurosaki, Masato, Cell Electrode and Electrochemical Cell Therewith.

U.S. Appl. No. 10/443,031, filed May 22, 2003, Kurosaki, Masato, Storage Element and Method of Fabricating Same.

U.S. Appl. No. 10/365,550, filed Feb. 13, 2003, Kurosaki, Masato, Secondary Battery and Capacitor Utilizing Indole Compounds.

U.S. Appl. No. 10/346,102, filed Jan. 17, 2003, Kurosaki, Masato, Battery Having a Sheet Current Collector Fluid–Tightly Separating Basic Cells.

U.S. Appl. No. 10/340,608, filed Jan. 13, 2003, Kurosaki, Masato, Group Signature Apparatus and Method.

U.S. Appl. No. 10/331,019, filed Dec. 27, 2002, Kurosaki, Masato, Energy Device Having Collectors with Rubber Materials Stacked in Layers and a Method of Fabricating the Energy Device.

U.S. Appl. No. 10/286,692, filed Nov. 1, 2002, Kurosaki, Masato, Electrochemical Cell Using Indole–Related Compounds.

U.S. Appl. No. 10/271,636, filed Oct. 15, 2002, Kurosaki, Masato, Electrolytic Solution and Electrochemical Cell Using the Same.

U.S. Appl. No. 10/153,631, filed May 24, 2002, Kurosaki, Masato, Method of Producing Electric Cells.

U.S. Appl. No. 10/044,985, filed Jan. 15, 2002, Kurosaki, Masato, Secondary Battery and Capacitor Using Indole Polymeric Compound.

U.S. Appl. No. 09/987,418, filed Nov. 14, 2001, Kurosaki, Masato, Method and Apparatus for Processing Subject Name Included in Personal Certificate.

U.S. Appl. No. 09/985,272, filed Nov. 2, 2001, Kurosaki, Masato, Secondary Battery of Proton Conductive Polymer.

U.S. Appl. No. 09/983,711 filed Oct. 25, 2001, Kurosaki, Masato, Method for Manufacturing Polymer Battery.

U.S. Appl. No. 09/689,817, filed Oct. 13, 2000, Kurosaki, Masato, Molded Electrode, Method for Production Thereof, and Secondary Battery Using Thereof.

U.S. Appl. No. 09/528,711, filed Mar. 20, 2000, Kurosaki, Masato, Electrode Using Improved Active Material for Battery and Capacitor.

U.S. Appl. No. 10/834,005, filed Apr. 29, 2004, Nakagawa, Yuuji, Secondary Battery and Capacitor Utilizing Indole Compounds.

U.S. Appl. No. 09/985,272, filed Nov. 2, 2001, Nakagawa, Yuuji, Secondary Battery of Proton Conductive Polymer.

U.S. Appl. No. 09/983,711 filed Oct. 25, 2001, Nakagawa, Yuuji, Method for Manufacturing Polymer Battery.

U.S. Appl. No. 10/838,742, filed May 4, 2004, Nobuta, Tomoki, Electrochemical Cell Stack.

U.S. Appl. No. 10/834,005, filed Apr. 29, 2004, Nobuta, Tomoki, Secondary Battery and Capacitor Utilizing Indole Compounds.

U.S. Appl. No. 10/827,179, filed Apr. 19, 2004, Nobuta, Tomoki, Electrochemical Cell.

U.S. Appl. No. 10/827,074, filed Apr. 19, 2004, Nobuta, Tomoki, Electrode for Electrochemical Cell and Electrochemical Cell Therewith.

U.S. Appl. No. 10/804,891, filed Mar. 19, 2004, Nobuta, Tomoki, Electrode and Electrochemical Cell Therewith.

U.S. Appl. No. 10/634,607, filed Aug. 5, 2003, Nobuta, Tomoki, Cell Electrode and Electrochemical Cell Therewith.

U.S. Appl. No. 10/443,031, filed May 22, 2003, Nobuta, Tomoki, Storage Element and Method of Fabricating Same.

U.S. Appl. No. 10/365,550, filed Feb. 13, 2003, Nobuta, Tomoki, Secondary Battery and Capacitor Utilizing Indole Compounds.

U.S. Appl. No. 10/346,102, filed Jan. 17, 2003, Nobuta, Tomoki, Battery Having a Sheet Current Collector Fluid–Tightly Separating Basic Cells.

U.S. Appl. No. 10/331,019, filed Dec. 27, 2002, Nobuta, Tomoki, Energy Device Having Collectors with Rubber Materials Stacked in Layers and a Method of Fabricating the Energy Device.

U.S. Appl. No. 10/286,692, filed Nov. 1, 2002, Nobuta, Tomoki, Electrochemical Cell Using Indole–Related Compounds.

U.S. Appl. No. 10/271,636, filed Oct. 15, 2002, Nobuta, Tomoki, Electrolytic Solution and Electrochemical Cell Using the Same.

U.S. Appl. No. 10/153,631, filed May 24, 2002, Nobuta, Tomoki, Method of Producing Electric Cells.

U.S. Appl. No. 09/985,272, filed Nov. 2, 2001, Nobuta, Tomoki, Secondary Battery of Proton Conductive Polymer.

U.S. Appl. No. 10/838,742, filed May 4, 2004, Mitani, Masaya, Electrochemical Cell Stack.

U.S. Appl. No. 10/834,005, filed Apr. 29, 2004, Mitani, Masaya, Secondary Battery and Capacitor Utilizing Indole Compounds.

U.S. Appl. No. 10/827,179, filed Apr. 19, 2004, Mitani, Masaya, Electrochemical Cell.

U.S. Appl. No. 10/827,074, filed Apr. 19, 2004, Mitani, Masaya, Electrode for Electrochemical Cell and Electrochemical Cell Therewith.

U.S. Appl. No. 10/804,891, filed Mar. 19, 2004, Mitani, Masaya, Electrode and Electrochemical Cell Therewith.

U.S. Appl. No. 10/634,607, filed Aug. 5, 2003, Mitani, Masaya, Cell Electrode and Electrochemical Cell Therewith.

U.S. Appl. No. 10/443,031, filed May 22, 2003, Mitani, Masaya, Storage Element and Method of Fabricating Same.

U.S. Appl. No. 10/365,550, filed Feb. 13, 2003, Mitani, Masaya, Secondary Battery and Capacitor Utilizing Indole Compounds.

U.S. Appl. No. 10/346,102, filed Jan. 17, 2003, Mitani, Masaya, Battery Having a Sheet Current Collector Fluid–Tightly Separating Basic Cells.

U.S. Appl. No. 10/331,019, filed Dec. 27, 2002, Mitani, Masaya, Energy Device Having Collectors with Rubber Materials Stacked in Layers and a Method of Fabricating the Energy Device.

U.S. Appl. No. 10/286,692, filed Nov. 1, 2002, Mitani, Masaya, Electrochemical Cell Using Indole–Related Compounds.

U.S. Appl. No. 10/271,636, filed Oct. 15, 2002, Mitani, Masaya, Electrolytic Solution and Electrochemical Cell Using the Same.

U.S. Appl. No. 10/153,631, filed May 24, 2002, Mitani, Masaya, Method of Producing Electric Cells.

U.S. Appl. No. 09/985,272, filed Nov. 2, 2001, Mitani, Masaya, Secondary Battery of Proton Conductive Polymer.

* cited by examiner

Self-discharge Characteristic

Electrolyte Concentration vs. Cycle Characteristic (Positive Electrode)

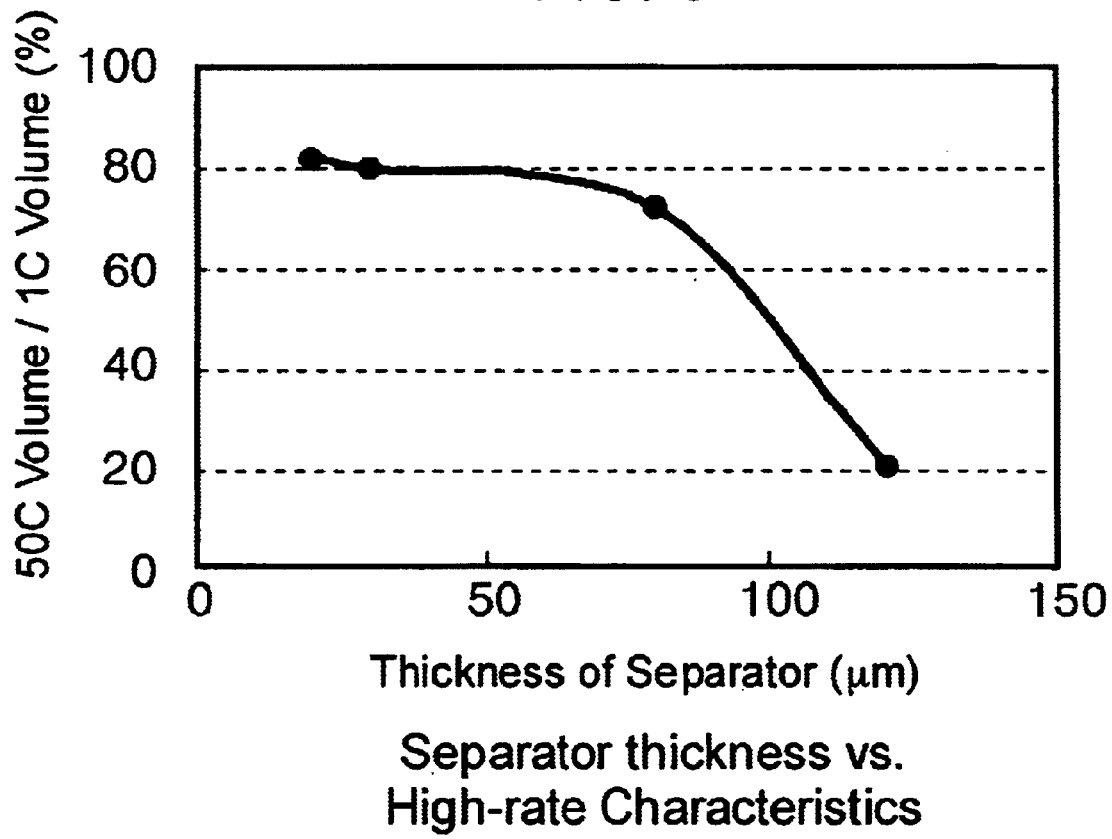

SECONDARY BATTERY OF PROTON CONDUCTIVE POLYMER

BACKGROUND OF THE INVENTION

1. Field of the Invention

This invention relates to a secondary battery of a proton conductive polymer, particularly the secondary battery, wherein a self-discharge characteristic and cycle characteristics are improved.

2. Description of the Related Art

A secondary battery of a proton conductive polymer consists of a construction, wherein a positive electrode is formed on a positive electrode collector and a negative electrode is formed on a negative electrode collector and these electrodes are piled up via a separator, and an aqueous or non-aqueous solution containing a proton source as an electrolytic solution are filled therein.

A method of forming an electrode consists of preparing slurry by adding a binder to powder of a raw material polymer, which is doped or not doped, and a conductive adjuvant on a collector such as a conductive rubber sheet and forming a membrane from the slurry using a coating means such as a doctor blade. After drying the membrane by heating, the thickness of the membrane is adjusted by press if required and then an electrode of required shape is formed by cutting the membrane.

A battery is constructed by arranging the positive electrode and the negative electrode formed as described above facing to each other via a separator impregnated with an electrolytic solution.

A porous olefinic membrane having both acid resistance and oxidation resistance has preferentially been used as a material for the separator by adjusting a pore size appropriately.

However, the battery of a proton conductive polymer of the prior art had a low self-discharge characteristic and both its capacity and its cycle characteristics were not satisfactory.

SUMMARY OF THE INVENTION

Therefore, the purpose of this invention is to provide a secondary battery of a proton conductive polymer having an excellent self-discharge characteristic and both an excellent capacity and excellent cycle characteristics.

As a result of intensive investigation to solve the problems, the inventors of this invention found that since an anion transfers as a charge carrier between both electrodes through a separator in an electrolytic solution of a secondary battery of a proton conductive polymer using a conventional porous olefinic membrane, a phenomenon of discharge inside the battery is promoted and a self-discharge characteristic becomes worse. Furthermore, it was found that a reduction in the capacity was caused by the self-discharge and, in addition, a reduction in the cycle characteristics was due to an easy transfer of an anion through the conventional separator and structure deterioration by dedoping. Furthermore, it was found that using a separator made of a membrane having a functional group, which has a function of a cation exchange, could solve these problems.

This invention relates to a secondary battery, wherein a positive and a negative electrodes are arranged facing to each other in an electrolytic solution via a separator and only a proton in a π conjugated macromolecular compound or a proton of a hydroxyl group in a hydroxyl-containing macromolecular compound, which is an active material of an electrode in the positive electrode and in the negative electrode participates in a charge/discharge; the secondary battery uses a membrane, which has acid resistance, oxidation resistance and a functional group having cation exchange function, as the separator. The separator thickness of 20 to 80 μm is particularly preferable.

Furthermore, it was found that the capacity increases and the cycle characteristics improves by providing a concentration difference of an electrolytic solution between in the positive electrode side and in the negative electrode side such that the concentration in the positive electrode side is low and the concentration in the negative electrode side is high. Particularly when the electrolytic solution consists of an aqueous solution of sulfuric acid and a concentration in the positive electrode side is 5 to 10% and a concentration in the negative electrode side is 30 to 40%, a secondary battery can be provided wherein each characteristic is excellent.

In this invention, by utilizing a separator made of a membrane which has a functional group having cation exchange function, it is possible to avoid a transfer of an anion which becomes a charge carrier and to provide a secondary battery of a proton conductive polymer, wherein only a proton in a π conjugated macromolecular compound or a proton of a hydroxyl group in a hydroxyl-containing macromolecular compound, which is an active material of an electrode in a positive electrode and in a negative electrode participates in a charge/discharge; the secondary battery has an excellent self-discharge characteristic, an excellent capacity and excellent cycle characteristics.

It is also possible to provide a secondary battery having an excellent high rate characteristic by specifying the membrane thickness of a separator.

It is also possible to provide an optimal concentration of an electrolytic solution both in a positive electrode side and in a negative electrode side by selecting an ion-exchange membrane as a separator and, therefore, to provide a secondary battery having a more excellent characteristic.

BRIEF DESCRIPTION OF THE DRAWINGS

FIG. 6 is a graph showing the effects of the membrane thickness on the high rate characteristics.

DETAILED DESCRIPTION OF THE PREFERRED EMBODIMENTS

It has already been known that an ion-exchange membrane is used as a separator in the field of an alkaline battery, a lithium-ion secondary battery and a fuel cell. It has also been well known that separating a positive electrode and a negative electrode via an ion-exchange membrane can control a deterioration of self-discharge characteristic caused by a deposition of a constituent material of the positive electrode on the negative electrode or a constituent material of the negative electrode transferring reversely to the positive electrode side.

It has been disclosed, for example, in Japanese Patent No. 2943792 that a proton conductive polymer such as 'NAFION' (Brand name of Du Pont Co.) can be used as a material of a solid electrolyte in a battery of a proton conductive polymer. In this patent, an application of 'NAFION' to the electrolyte in the battery of a proton conductive polymer is described only focusing to a proton conductivity of 'NAFION'.

In other words, a role of 'NAFION' is to mediate a transfer of a proton between the positive electrode and the negative electrode and, therefore, an effect of controlling the transfer of an anion is not taken into consideration contrary to this invention. The function of 'NAFION' is only to control dissolution of an active material of electrode into an electrolytic solution and is substituted for a conventional electrolytic solution as a proton conductive material.

Furthermore, 'NAFION' was used as a main raw material for an ion-exchange membrane, and if it was used as a material for a separator in a battery of a proton conductive polymer, a rate of proton conduction was expected to be reduced comparing to a rate of proton conduction in an aqueous electrolytic solution by being accompanied with exchange action of an a cation including a proton. Therefore, 'NAFION' has never been selected as the separator because a high rate characteristic such as a rapid charge/discharge was expected to be made worse.

However, surprisingly it was found that utilizing a polymer membrane having a functional group having an ion-exchange function such as 'NAFION' as a separator for a battery of proton conductive polymer can control an anion transfer effectively resulting in an improvement of a self-discharge characteristic, a capacity, and cycle characteristics, and an excellent high rate characteristic is obtained by specifying the thickness of the membrane.

Figure 1A:
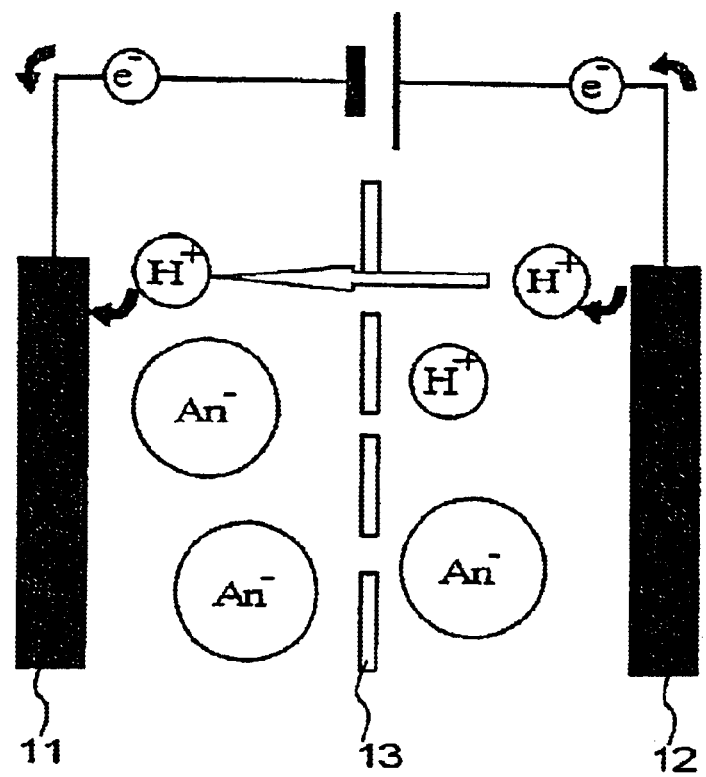
FIGS. 1(a)–(b) is a conceptual drawing illustrating a cause of a self-discharge when using a separator consisting of a conventional polyolefin porous membrane.

FIG. 1 illustrates a conceptual drawing explaining a problem when a conventional porous polyolefinic membrane is used as a separator and an ion transfer in an electrolytic solution during (a) charge and (b) a self-discharge.

Figure 1B:
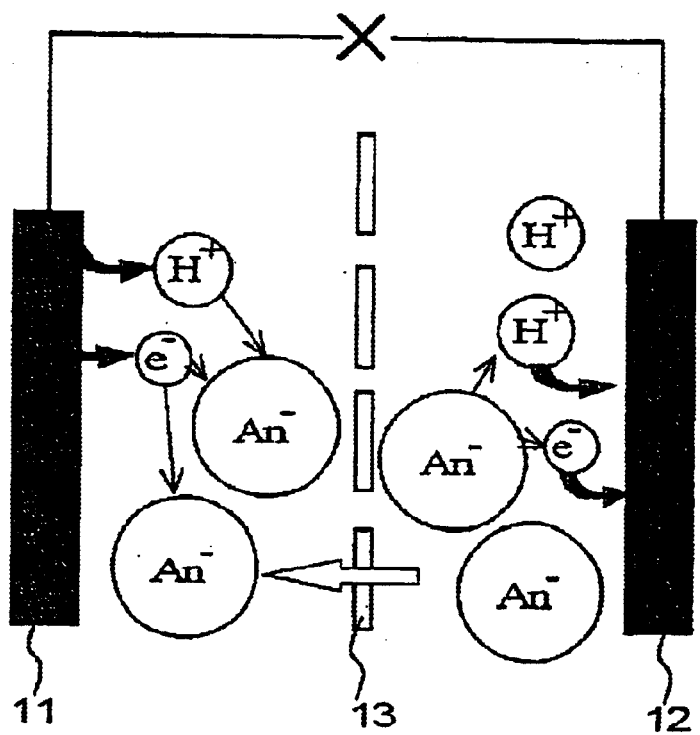

A positive electrode 11 and a negative electrode 12 are arranged facing to each other via a separator 13 and (a) during charge, when an electric charge is introduced into the positive electrode 11, a transfer of a proton from the negative electrode 12 occurs simultaneously resulting in a charged state of the positive electrode with proton-rich state. During a discharge, the proton transfers reversely from the positive electrode 11 to the negative electrode 12. On the other hand, at a state of cutting the connection between both electrodes, an anion becomes an electric charge carrier and a self-discharge proceeds as illustrated in FIG. 1(b). This promotes dedoping of a dopant causing a deterioration of the electrode structure. These phenomena occur because the separator cannot control a transfer of an anion.

Figure 2:
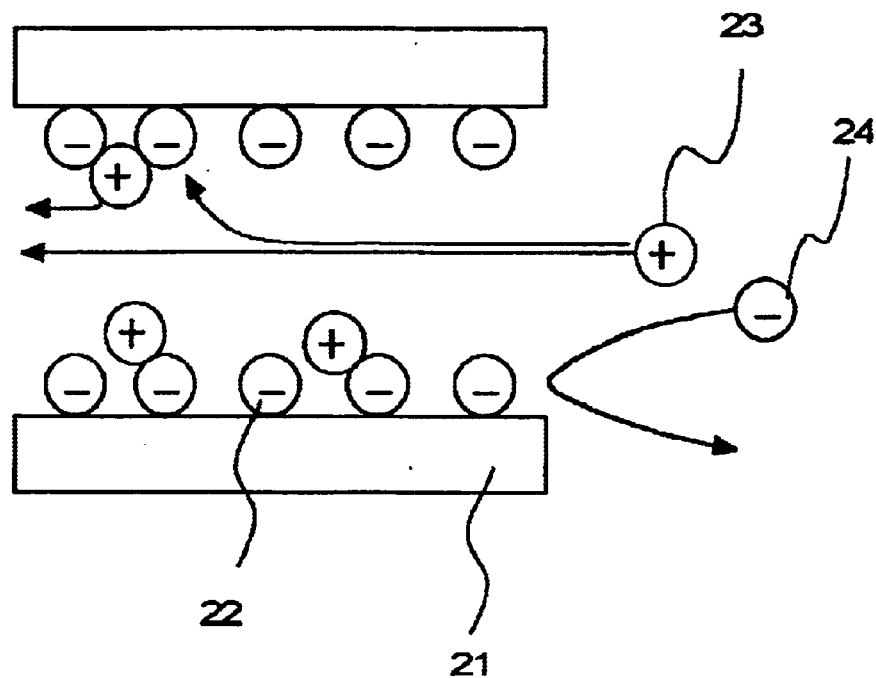
FIG. 2 is a rough drawing describing a behavior of each ion in an electrolytic solution when using a cation exchange membrane of this invention.

On the other hand, when an ion-exchange membrane 21 is used as a separator, as illustrated in FIG. 2, a cation 23 is trapped by an ion-exchange group 22 such as —SO$_3^-$ or —COO$^-$ and the ion is exchanged when an ion with large valency remains in the ion-exchange resin but a proton has a lower trapping function and is exchanged easily. An anion 24 cannot transfer through the resin due to charge repulsion, and the anion becomes an electric charge carrier and a self-discharge does not proceed as illustrated in FIG. 1(b) and, therefore, the self-discharge characteristic is improved.

Furthermore, since the transfer of the anion is restricted, a reduction in the dopant concentration in the electrode is controlled and the conventional deterioration of the electrode structure due to dedoping does not occur and cycle characteristics are also improved.

Figure 3:
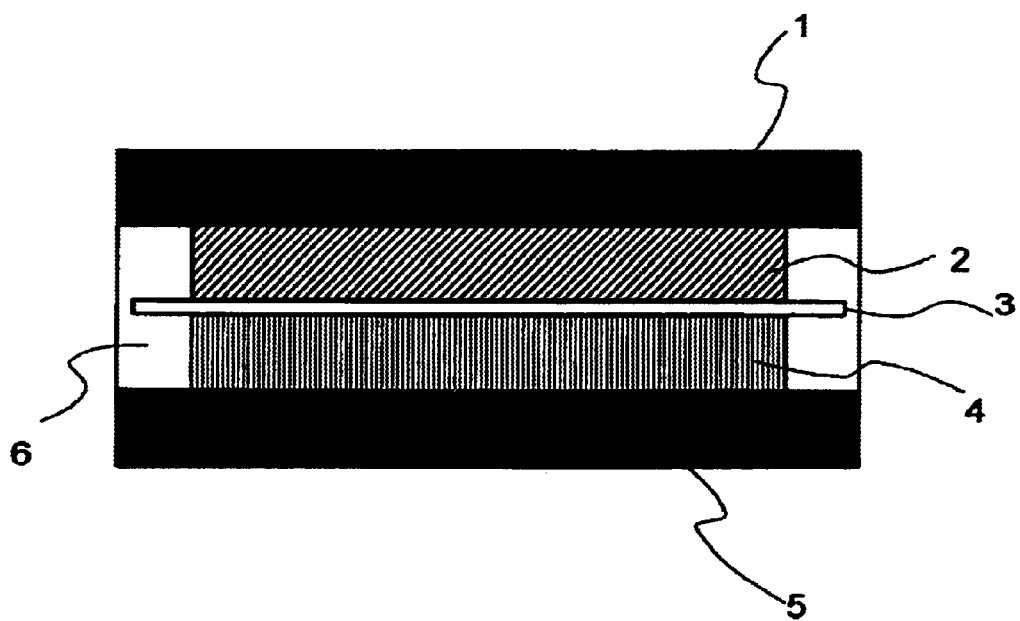
FIG. 3 is a rough cross section of a working form of a battery of this invention.

A structure of a secondary battery of this invention will be explained referring to a drawing. FIG. 3 is a conceptual drawing of a secondary battery of a proton conductive polymer relating to this invention. A positive electrode 2 is provided on a positive electrode collector 1 and a negative electrode 4 is provided on a negative electrode collector 5 and these electrodes are piled up facing to each other via a separator 3 consisting of an ion-exchange membrane to construct a battery. In this example the separator 3 being supported by a gasket 6 separates the positive electrode and the negative electrode completely. However, when a concentration difference of an electrolytic solution is not provided as described later, the separator may be provided only in an area of separating both electrodes so that the electrolytic solution may not be separated.

Each electrode is made of a binder matrix wherein an electrode active material of a polymer and a conductive adjuvant such as carbon black are dispersed. Polymers used as an active material are, for example, $\pi$ conjugated macromoleculars such as polyaniline, polythiophene, polypyrrole, polyacetylene, poly-p-phenylene, polyphenylene vinylene, polyperinaphthalene, polyfuran, polyfurane, polythienylene, polypyridinediyl, polyisothianaphthene, polyquinoxaline, polypyridine, polypyrimidine, polyindole, polyaminoanthraquinone, and the derivatives of these polymers and hydroxyl group-containing macromoleculars (hydroxyl group formed by conjugation of oxygen in quinone) such as polyanthraquinone and polybenzoquinone. When a redox pair is formed by doping these polymers, an electric conductivity appears. As for a doping method, there is an electrochemical or a chemical doping method wherein a solution containing an anion species of a dopant is added to powder of a raw material polymer and the mixture is heated adequately, and there is another method wherein after molding a shape of an electrode together with a conductive adjuvant and a binder, the same method as mentioned above is applied, and any one of these methods may be used. In order to apply these polymers to a positive electrode and a negative electrode, a combination of polymers selected based on a redox potential difference is adopted. Particularly, a combination of polyindole, as indicated below, as an active material of a positive electrode and polyphenylquinoxaline, as indicated below, as an active material of a negative electrode is preferable.

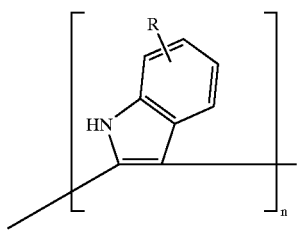

R=H, CN, NO$_2$, (F)$_r$ r:1–4

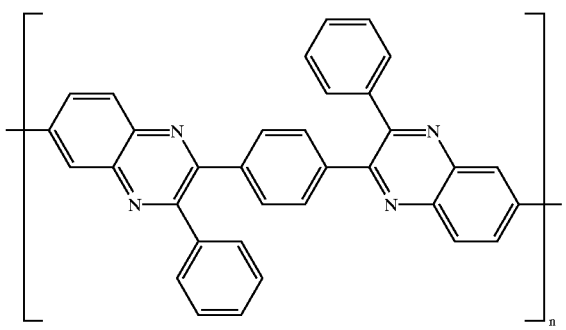

The electrolytic solution is an aqueous or non-aqueous solution containing a proton source, and an aqueous solution of protonic acid such as sulfuric acid, hydrochloric acid, and phosphoric acid is particularly preferable.

A separator used in this invention is not particularly limited if it has a functional group such as sulfonic group or carboxyl group having a cation exchange function, but it has to be acid resistant because the aqueous solution of protonic acid is utilized for the electrolytic solution. In order to provide the separator with the cation exchange function, the following methods may be applied: a conventional sulfonation method by treating a porous olefinic membrane itself in a hot sulfuric acid; a method of utilizing a market product of ion-exchange membrane as it is, such as 'FLEMION' (Trade mark), a product of Asahi Glass Co., 'NAFION' (Trade mark), a product of Du Pont Co.; a method of compounding an ion-exchange resin with an olefinic resin by a graft polymerization.

These resins are molded by extrusion and a sheet of film is made by extension to make a separator. The thickness of the separator depends on an amount of ion-exchange functional group introduced and is less than 100 µm, preferably 20 to 80 µm. If the thickness is larger, a high rate characteristic may not be obtained sufficiently.

Although an exchange capacity of the ion-exchange membrane is not particularly specified, if the capacity is too low, a self-discharge cannot be avoided due to a weakening of repulsion against an anion and if it is too high on the contrary, a transfer of a proton is undesirably hindered. Normally the exchange capacity of 1.7 to 2.0 meg/cm$^3$ is good enough.

Furthermore, in this invention, it is possible to make a difference of a concentration of the electrolytic solution between in the positive electrode side and in the negative electrode side by utilizing an ion-exchange membrane as a separator. Especially, according to the inventors' study, it is found that a concentration of the electrolytic solution in the positive electrode side and in the negative electrode side are different, respectively, for obtaining an optimal capacity characteristic. It is also found that an excellent capacity characteristic can be kept for a long time by providing a sulfuric acid concentration of 5 to 10% in the positive electrode side and that of 30 to 40% in the negative electrode side, especially when an aqueous solution of sulfuric acid is used as the electrolytic solution.

So far, a secondary battery of a polymer constructed via only a separator impregnated with an electrolytic solution has been explained. However, this invention is not to be construed as being limited to the battery mentioned above and can also be applied to a construction having a solid electrolyte, a gel solid electrolyte and a molten salt electrolyte.

This invention will be explained concretely referring to the following examples and is not to be construed as being limited only to the examples.

EXAMPLE 1

Polyfluorovinylidene (mean molecular weight: 1100) resin as a binder was added by 8 wt % to a mixture of polyindole as an active material of a positive electrode and carbon grown in the vapor phase as a conductive adjuvant in a weight ratio of 4:1 and a slurry was prepared by stirring the mixture completely by a homogenizer. This slurry was applied onto a collector sheet consisting of a conductive rubber sheet by using a doctor blade to form a layer and the layer was dried at 100 to 150° C. under vacuum for an hour. After drying, the layer was pressed by a rolling press to the thickness of 10 µm and cut to a required form to make a positive electrode.

Polyfluorovinylidene (mean molecular weight: 1100) resin as a binder was added by 8 wt % to a mixture of polyphenylquinoxaline as an active material of a negative electrode and carbon grown in the vapor phase as a conductive adjuvant in a weight ratio of 3:1 and a slurry was prepared by stirring the mixture completely by a homogenizer. This slurry was applied onto a collector sheet consisting of a conductive rubber sheet by using a doctor blade to form a layer and the layer was dried at 100 to 150° C. under vacuum for an hour. After drying, the layer was pressed by a rolling press to the thickness of 100 µm and cut to a required form to make a negative electrode.

Doping was performed by dipping the positive electrode and the negative electrode formed as described above in an aqueous solution of sulfuric acid (concentration: 20%) and applying an electric current (6 mA/cm$^2$) between both electrodes for 30 min.

After a separator, i.e., a cation exchange membrane 'NAFION 17' (Brand name), a product of Du Pont Co., having 20 µm thickness was impregnated with an electrolytic solution (20% aqueous solution of sulfuric acid), the positive electrode and the negative electrode described above were piled up facing to each other via the separator to make a secondary battery.

Comparative Example 1

A secondary battery was made by the same method as in Example 1 except for using an olefinic porous membrane as a separator.

Figure 4:
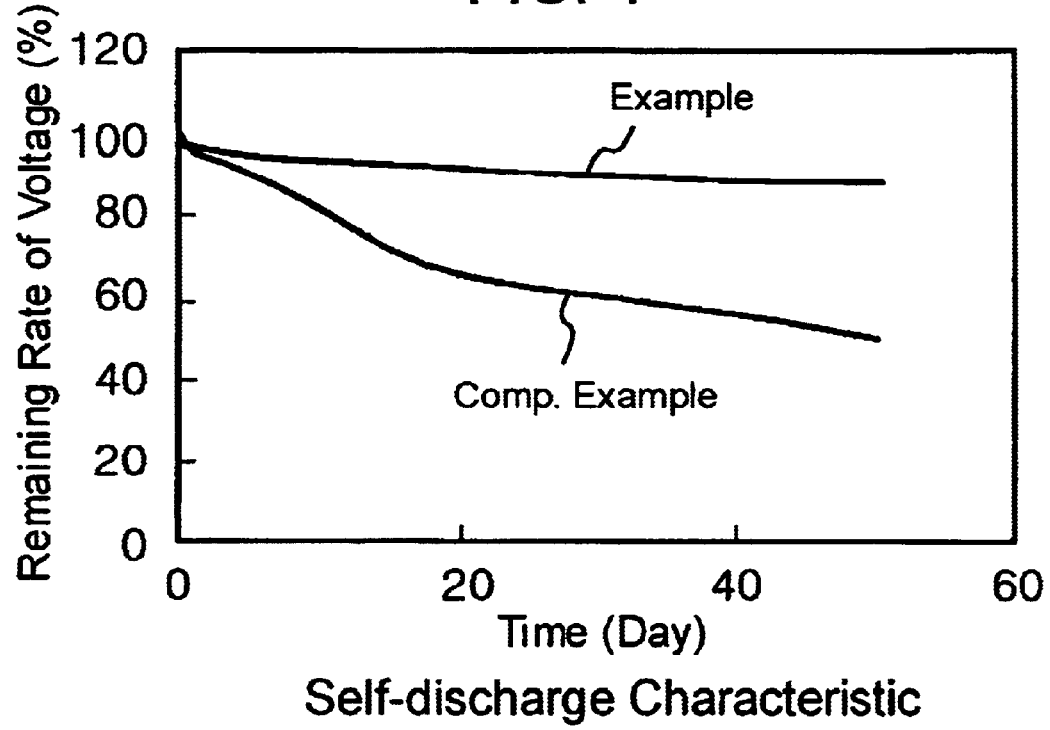
FIG. 4 is a graph showing a comparison between a self-discharge characteristic of the battery in Example 1 and that of the battery in Comparative Example 1.

Self-discharge characteristics of the secondary battery made in Example 1 and the secondary battery made in Comparative Example 1 were measured. The results of the measured data are indicated in FIG. 4. The conditions of the measurement are as follows:

Charge: 30 mA/cm$^2$, 1.2 V, CCCV charge for 10 min.

The charge circuit was opened after completing the charge.

Monitoring voltages between both terminals of each cell, voltage changes were investigated from the beginning.

As can be seen, in the case of Comparative Example 1 wherein a conventional olefinic porous membrane was used, the self-discharge characteristic was poor and a rate of remaining voltage after 50 days was reduced to about 50%. On the other hand, in the case of Example 1 wherein a cation exchange membrane was used, the self-discharge characteristic was greatly improved indicating nearly 90% of the rate of remaining voltage after 50 days.

EXAMPLE 2

In Example 1, the electrodes were formed by applying a slurry onto a collector sheet, in Example 2 another method, i.e., a method of forming a press-electrode will be explained.

As for a positive electrode, a mixture (weight ratio 4:1) of polyindole as an active material and carbon grown in the vapor phase as a conductive adjuvant was stirred sufficiently by a high speed blender and the mixture was pressed at 300° C. and 19.6 MPa (200 kgf/cm$^2$) for 2 minutes by a hot-press to form a required shape of a positive electrode.

As for a negative electrode, a mixture (weight ratio 3:1) of polyphenylquinoxaline as an active material and carbon grown in the vapor phase as a conductive adjuvant was stirred sufficiently by a high speed blender and the mixture was pressed at 300° C. and 29.4 MPa (300 kgf/cm$^2$) for 2 minutes by a hot-press to form a required shape of electrode. The formed electrode was put in a muffle furnace, heated to 500° C. in an hour and kept at 500° C. for 3 hours. After cooling, it was used as a negative electrode.

Then, as in the case of Example 1 the positive electrode and the negative electrode were piled up facing to each other via a separator impregnated with the electrolytic solution to make a secondary battery.

This battery indicates the same discharge characteristics as that of Example 1.

EXAMPLE 3

A reduction capacity and an oxidation capacity of the positive electrode and the negative electrode were measured by changing the concentration of sulfuric acid in the electrolytic solution from 5 to 50% range in Example 1 as indicated in Table 1 shown below.

TABLE 1

| Positive electrode | | Negative electrode | |
| --- | --- | --- | --- |
| Concentration of sulfuric acid | Reduction capacity (mAh/g) | Concentration of sulfuric acid | Oxidation capacity (mAh/g) |
| 5% | 98.9 | 20% | 80.5 |
| 10% | 90.4 | 30% | 98.4 |
| 20% | 81.2 | 40% | 110.3 |
| 40% | 77.2 | 50% | 77.2 |

The reduction capacity and the oxidation capacity were measured according to the following method:

Measurement was conducted using a potentionstat meter by arranging an Ag/AgCl electrode in a reference electrode, and a negative electrode and a positive electrode in working electrodes.

Oxidation capacity (Negative electrode)

Charge: CC charge to −200 mV of a negative electrode potential at 6 mA/cm$^2$

Discharge: CC discharge from −200 mV to +500 mV at 6 mA/cm$^2$

Reduction capacity (Positive electrode)

Charge: CC charge to +1050 mV of a positive electrode potential at 6 mA/cm$^2$

Discharge: CC discharge from +1050 mV to +200 mV at 6 MA/Cm$^2$

According to Table 1, higher reduction capacities were indicated at a concentration of sulfuric acid from 5 to 10% in the positive electrode and higher oxidation capacities were indicated at a concentration of sulfuric acid from 30 to 40% in the negative electrode.

Figure 5:
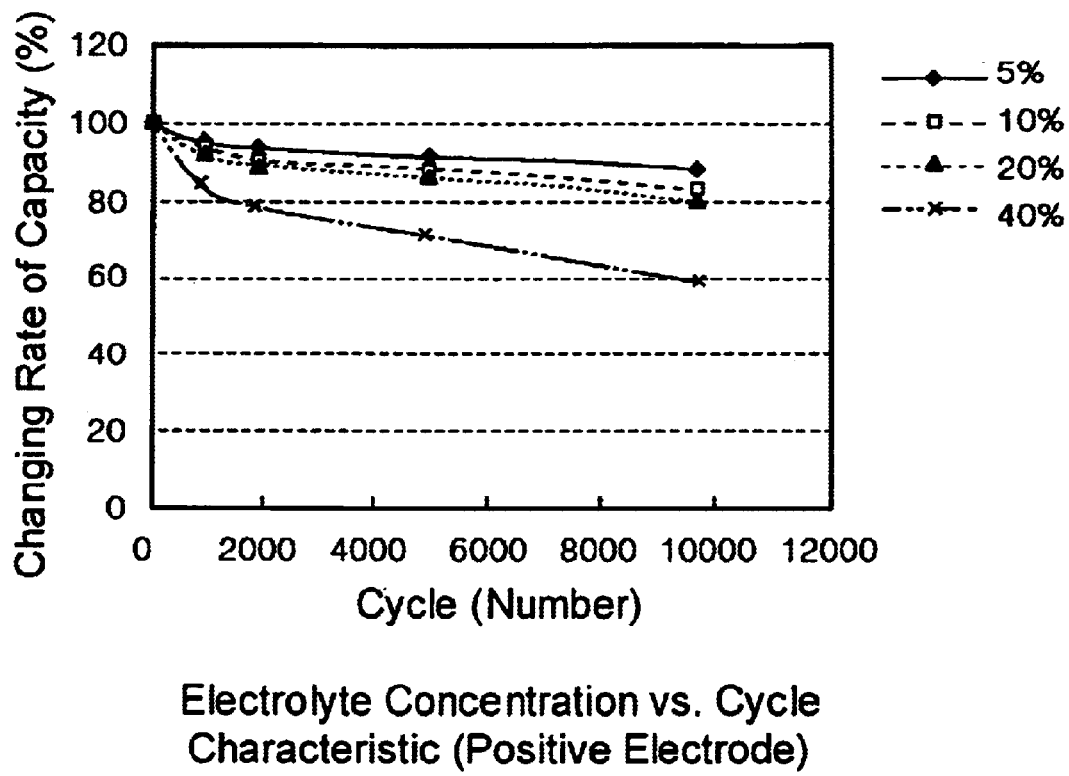
FIG. 5 is a graph showing a relationship between the concentrations of the electrolytic solution in the positive electrode and cycle characteristics.

Effects of a sulfuric acid concentration on cycle characteristics were measured by changing the concentration in the positive electrode side and the results are illustrated in FIG. 5. The conditions of the measurement are as follows:

Charge: 30 mA/cm$^2$, 1.2 V, CCCV charge for 10 min

Discharge: CC discharge at 6 mA/cm$^2$, End Voltage=0.8 V

From the results described above it can be understood that an optimal concentration is different between in the positive electrode side and in the negative electrode side. In this invention as illustrated in FIG. 3, it is possible to have a different concentration of an electrolytic solution in a positive electrode and a negative electrode by separating the positive electrode and the negative electrode completely via an ion-exchange membrane and since a battery constructed like this has an optimal concentration of the electrolytic solution in the positive electrode side and in the negative electrode side, respectively, a high capacity can be kept for a long time.

EXAMPLE 4

A high rate characteristic at a high rate discharge was measured by changing the thickness of the ion-exchange membrane of the separator in Example 1 according to the following method. The results of the measurements are illustrated in FIG. 6.

High rate characteristic

Charge: 30 mA/cm$^2$, 1.2 V, CCCV charge for 10 min

Discharge: CC discharge (1C) at 6 mA/cm$^2$

Discharge: CC discharge (50C) at 300 mA/cm$^2$

FIG. 6 illustrates that when the thickness of the separator is 20 to 80 μm, a high high-rate characteristic is obtained but when the thickness is more than 80 μm, the characteristic decreases rapidly. From this fact, it can be understood that an ion-exchange membrane used as a separator having the thickness of 20 to 80 μm is preferable to satisfy even the high rate characteristic.

What is claimed is:

1. A secondary battery of a proton conductive polymer, wherein a positive and a negative electrode are arranged facing to each other in an electrolytic solution via a separator and only a proton in a π conjugated macromolecular compound or a proton of a hydroxyl group in a hydroxyl-containing macromolecular compound, which is an active material of an electrode in the positive electrode and in the negative electrode participates in a charge/discharge; the secondary battery uses a membrane, which has acid resistance, oxidation resistance and a functional group having cation exchange function, as the separator, and wherein a concentration difference of the electrolytic solution between in the positive electrode side and in the negative electrode side is such that the concentration in the positive electrode side is low and the concentration in the negative electrode side is high.

2. A secondary battery of a proton conductive polymer, wherein a positive and a negative electrode are arranged facing to each other in an electrolytic solution via a separator and only a proton in a π conjugated macromolecular compound or a proton of a hydroxyl group in a hydroxyl-containing macromolecular compound, which is an active material of an electrode in the positive electrode and in the negative electrode participates in a charge/discharge; the secondary battery uses a membrane, which has acid resistance, oxidation resistance and a functional group having cation exchange function, as the separator, and wherein the electrolytic solution consists of an aqueous solution of sulfuric acid and the concentration of sulfuric acid in the positive electrode side is 5 to 10% and the concentration of sulfuric acid in the negative electrode side is 30 to 40%.

3. The secondary battery as claimed in claim 1, wherein thickness of the separator is 20 to 80 $\mu$m.

4. The secondary battery as claimed in claim 2, wherein thickness of the separator is 20 to 80 $\mu$m.

* * * * *